Figure 7:
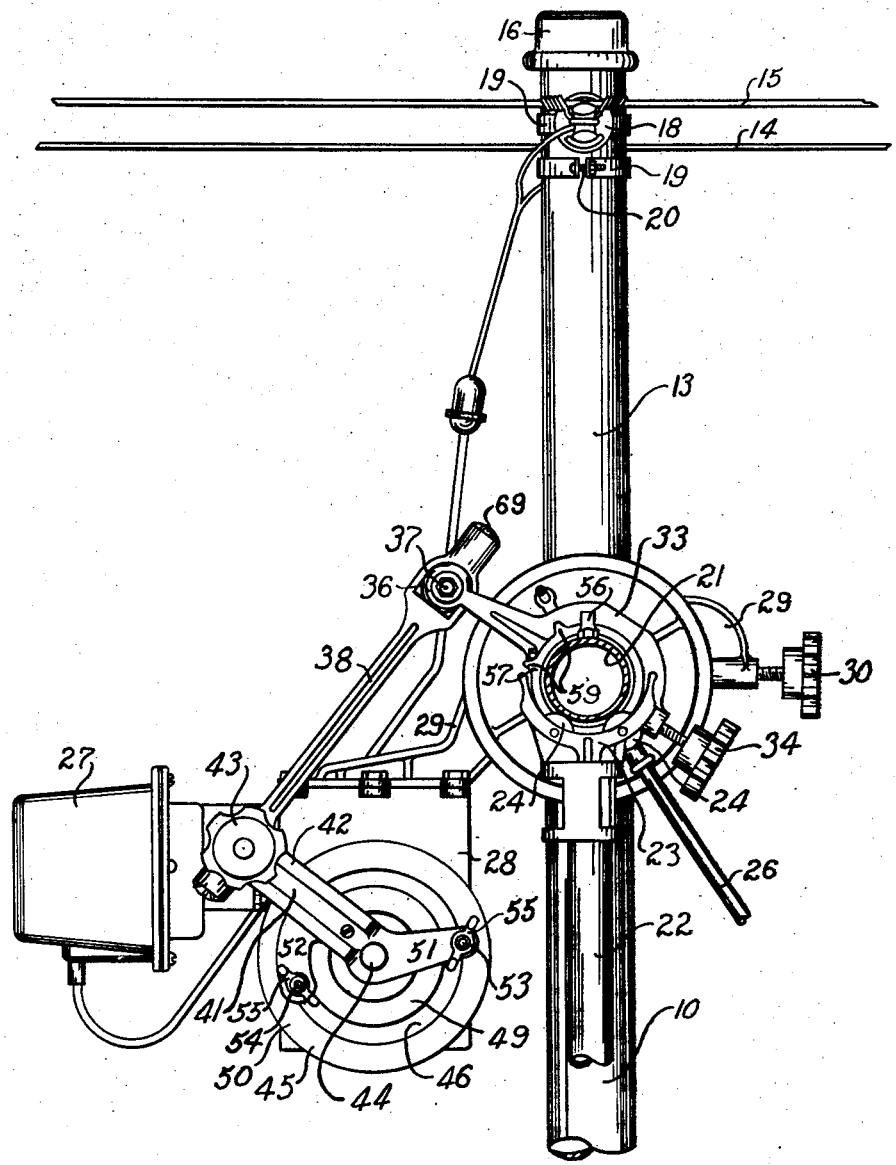

July 20, 1943. R. P. PARADISE 2,324,947
IRRIGATING PIPE OSCILLATOR
Filed May 8, 1941 3 Sheets-Sheet 1
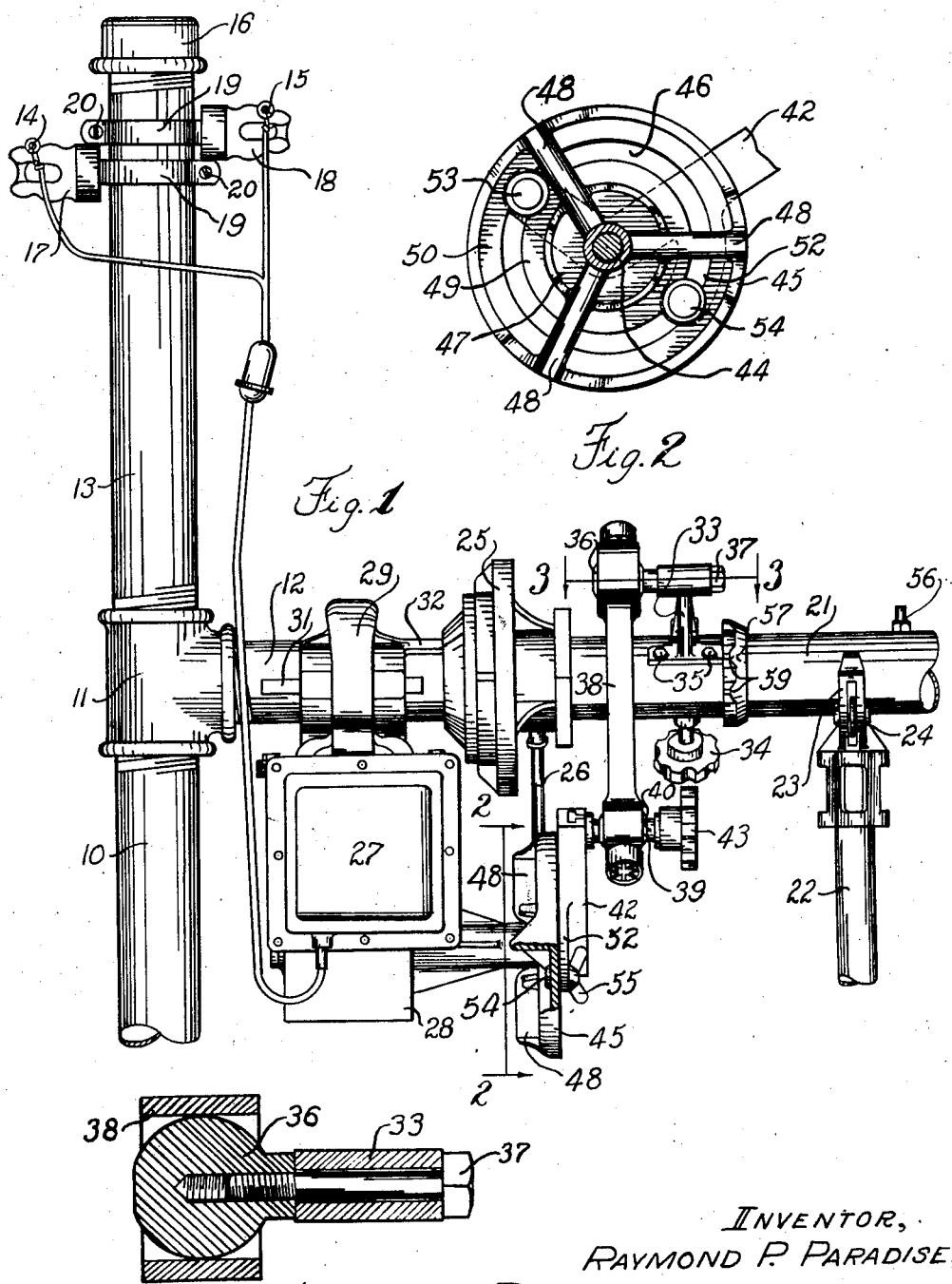
INVENTOR,
RAYMOND P. PARADISE,
BY Minturn & Minturn
ATTORNEYS.

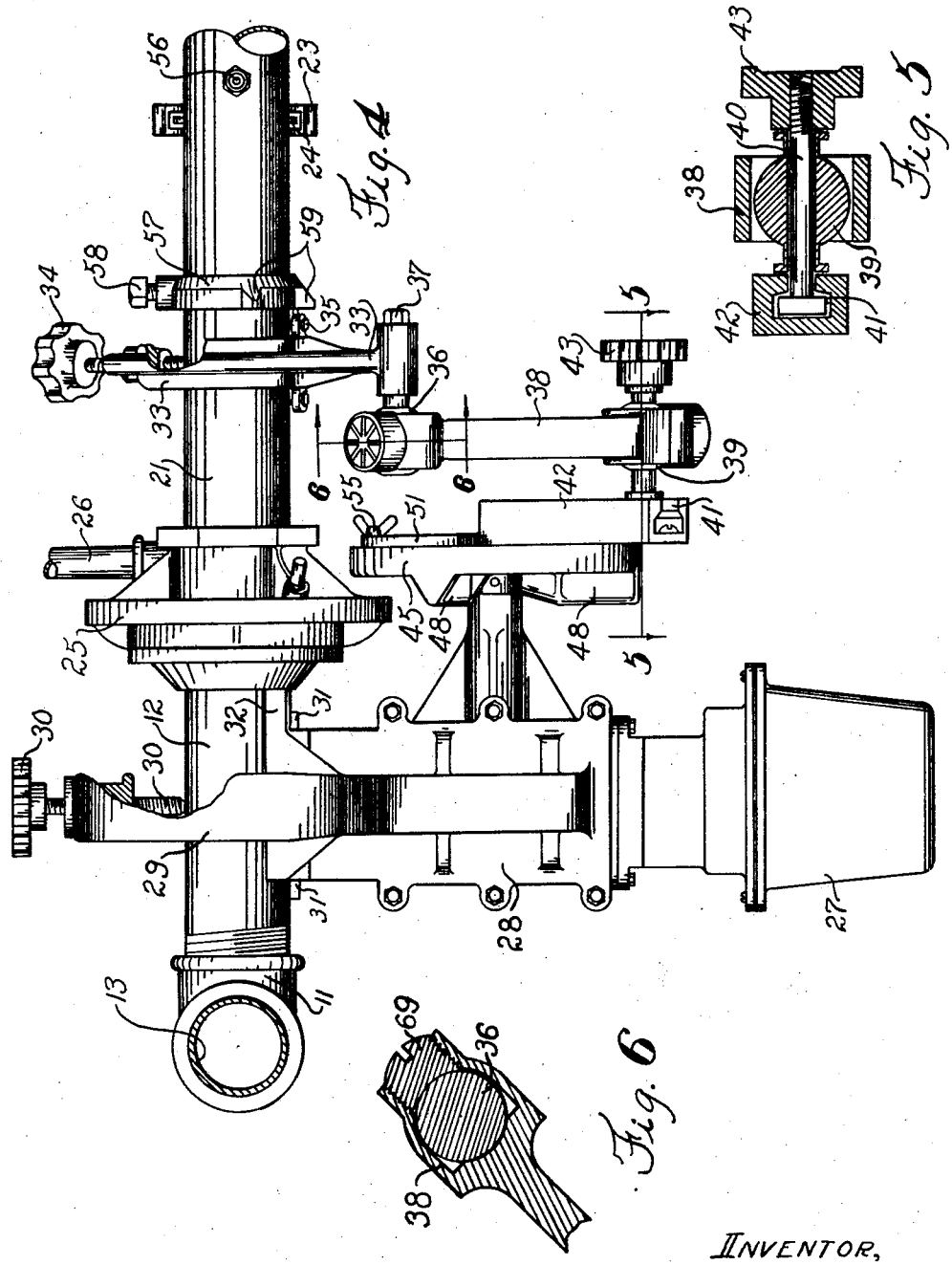

Patented July 20, 1943

2,324,947

UNITED STATES PATENT OFFICE 2,324,947

IRRIGATING PIPE OSCILLATOR

Raymond P. Paradise, Indianapolis, Ind.

Application May 8, 1941, Serial No. 392,502

6 Claims. (Cl. 299—62)

This invention relates to an overhead irrigating system wherein water is supplied through standpipes forming supporting members for the horizontal runs and also forming standards for carrying an electric power line. Within the system is included electric power driven means for oscillating the horizontal lines of the system.

Heretofore it has been a common practice to mount horizontal lines on posts and oscillate those lines by water motors with a consequent loss of much water. Very little flexibility was had in the range through which the lines would be oscillated and particularly in the location of the angle of oscillation in order to overcome the effects of winds.

In my invention there is provided a very simple and flexible unit for oscillating the horizontal pipe line and for varying not only the degree of oscillation but also in varying the position of that oscillation in respect to throwing the water spray all to one side of the pipe line, to equal sides of the pipe line, or all on the other side of the pipe line, or through any variations thereof depending upon the conditions under which the irrigation is to be conducted. I employ an electric motor for driving the oscillating means so that there is no waste of water and particluarly there is no muddling of the ground due to the exhaust or discharge of a water motor at the pipe line. With the use of my system, the irrigating water may be piped directly to the end standards supporting the horizontal pipe runs and the water carried up through the standards and directly into the horizontal pipes. The upper ends of these standards serve as supports for the electric line required to connect with the oscillating motor. This combination, of course, avoids the necessity for additional standards, posts, and the like and aids greatly in providing an extremely simple and yet effective and durable irrigating system.

These and many other objects and advantages of the invention will become apparent to those versed in the art in the following description of one particular form of the invention as illustrated in the accompanying drawings, in which Fig. 1 is a view in side elevation of a structure embodying the invention;

Fig. 2, a detail in section on the line 2—2 in Fig. 1;

Fig. 3, a detail in section on the line 3—3 in Fig. 1;

Fig. 4, a top plan view;

Fig. 5, a detail in section on the line 5—5 in Fig. 4;

Fig. 6, a detail in section on the line 6—6 in Fig. 4; and

Fig. 7, a view in end elevation.

Like characters of reference indicate like parts throughout the several views in the drawings.

A pipe 10 is erected to form an end post or standard and is suitably connected by its lower end to a source of water under pressure, the usual practice, of course, being to make such connection under ground so that the pipe 10 may be set in the ground to stand erect. The upper end of the pipe 10 terminates at the desired level at which the horizontal irrigating lines are to be positioned.

A T fitting 11 is screw-threadedly engaged on the upper end of the pipe 10 and carries a nipple 12 in the side opening and a length of pipe 13 in the top opening. The length of this pipe 13 is made to be such that the electric wires 14 and 15 forming the power line may be carried at an elevation beyond the danger zone. The upper end of the pipe 13 is closed off by any suitable means, such as by the cap 16, so that no water may discharge from the pipe 10 except laterally through the nipple 12. The upper end of the pipe 13 above the fitting 11 thus serves as an air chamber. The wires 14 and 15 are carried by the pipe 13 by any suitable insulating means, such as by the ceramic insulators 17 and 18 that are each equipped with straps 19 to encircle the pipe 13 and be drawn together by a bolt 20. This gives a very flexible mounting to support the wires 14 and 15 in that the insulators may be adjusted circumferentially about the pipe 13 and may be raised and lowered therealong, all as the particular installation requirement may demand.

The horizontal distributing pipe 21 extends outwardly in axial alignment with the nipple 12 to be supported in any suitable manner, such as by a post 22 carrying an upper Y fitting 23 that is preferably provided with anti-friction rollers 24 on which the pipe 21 directly rests. A swivel type connection must be made between the nipple 12 and the pipe 21 so as to conduct water in the pipe 21 without leakage and at the same time permit the pipe 21 to oscillate about its axis in reference to the standard nipple 12.

A preferred connection between the nipple 12 and the pipe 21 is of that construction as is shown in my U. S. Letters Patent No. 2,010,886, issued August 13, 1935, such connection being indicated by the numeral 25. A lever 26 joins with part of the connection which is fixed to the pipe 21 so that the pipe 21 may be rocked by hand, for example, in the preliminary setting up of the oscillating mechanism or in making adjustments for the location of the range of oscillation desired under different weather or other conditions.

A suitable electric motor 27, preferably of the small synchronous type, although not necessarily so, is mounted on a gear box 28 that has extending therefrom a clamp arm 29. This arm 29 is formed to curve upwardly and over the nipple 12 and carries a hand screw 30 which may be carried inwardly against the nipple 12 to clamp the gear box 28 and its motor in a fixed position on the nipple 12. The part of the arm 29 which is adjacent the gear box 28 is preferably formed to have a curvature corresponding to that of the nipple 12 and in this part a key 31, fixed to the nipple 12, is positioned so as to prevent rocking of the arm 29 circumferentially around the nipple 12. Also a finger 32 extends from the side of the arm 29 along the nipple 12 to be abutted against the end of the swivel connection 25 as a definite locating means of the motor and its driving connections.

A mounting clamp 33 is formed to fit over the pipe 21 to be selectively engaged circumferentially therearound at any required position by means of the hand screw 34. As an aid in preventing slippage of the clamp 33 around the pipe 21, a portion of the clamp opposite the hand wheel 34 is provided with a pair of cap screws 35 that carry sharpened points against the pipe 21, Fig. 4.

On the side of the clamp 33 opposite the hand wheel 34 is a ball head 36 secured in fixed position against the clamp 33 by a cap screw 37, Fig. 3. A connecting rod 38 has an upper end engaged over the ball 36 and rockably attached thereto by means of an adjustable socket 69, Fig. 6, screw-threadedly carried in the upper end of the rod 38. The lower end of the connecting rod 38 drops downwardly and receives a ball connection 39 that is mounted on a bolt 40. The head of this bolt 40 is carried within a T slot 41 of an arm 42. The ball 39 is adjustably positioned along the arm 42 by a hand wheel 43 screw-threadedly engaging the outer end of the bolt that extends beyond the ball 39, Fig. 5. Tightening the hand wheel 43 compressively engages the ball 39 between the hand wheel 43 and the arm 42 while the head of the bolt 40 is drawn snugly up against the inner sides of the overhanging flanges of the arm 42.

The arm 42 is in turn rockably mounted on the end of the driving shaft 44 that extends from the gear box 28. The motor 27 drives the shaft 44 through reduction gearing in the usual manner carried in the gear box 28 so that the final drive shaft 44 turns relatively slow in comparison with the speed of the motor itself. The gear reduction may, of course, be varied to suit the particular requirements as to speed of oscillation of the irrigating pipe line.

Fixed to the shaft 44 is a spider 45 arranged to have an annular slot 46 completely therearound. This construction is achieved by forming the spider to have a hub portion 47 from which arms 48, here shown as three in number, radiate to carry the inner and outer rings 49 and 50 respectively in a common plane separated by the slot 46, Fig. 2.

The arm 42 carries a pair of feet 51 and 52 through each of which extends respectively the bolts 53 and 54 through the slot 46 with their heads in abutment against both rings 49 and 50 and carrying wing nuts 55 on their outer ends in abutment with the feet 51 and 52. Thus by loosening the wing nuts 55, the arm 42 may be shifted to any position around the spider 45 throughout a complete 360 degree range.

In setting up the oscillating mechanism above described, the clamp 29, from which is suspended the motor 27 and its reduction gear box 28, is attached to the nipple 12 and secured in position by running down the hand wheel 30. The pipe 21 is turned through its swivel connector 25 by means of the handle 26 to bring the orifices or, as indicated in the present form, jet nozzles 56 uppermost. The clamp 33 is then placed over the pipe 21 and secured in position by running up the hand wheel 34. The wing nuts 55 are loosened as is also the hand wheel 43 so that the arm 42 and the bolt 40 may be properly adjusted to give the desired degree of oscillation and also to locate the arc of travel of the pipe 21. By shifting the bolt 40 along the slot 41 in the arm 42, the length of arc of travel is varied. By shifting the arm 42 around the spider 45, and shifting the clamp 33 around the pipe 21, the location of the arc of oscillation is obtained. To aid in locating the clamp 33, a collar 57 may be initially slipped over the pipe 21 and may be longitudinally adjusted to any position therealong and secured in that position by means of a set screw 58 passing through the collar into contact with the pipe 21. The collar 57 is provided with a pair of spaced apart indicating pointers 59 to aid in locating this arc of travel wherever it may be desired.

When the desired location is secured, the arm 42 is fixed against the spider 45 by tightening the wing nuts 55 and tightening the hand wheel 43. Then upon allowing the current to flow from the line wires 14 and 15 to the motor 27, the pipe 21 will be oscillated accordingly. Further adjustments may be made, of course, to direct the spray from the jets 56 as may be desired.

While I have herein shown and described my invention in the one particular form, it is obvious that structural variations may be employed without departing from the spirit of the invention and I, therefore, do not desire to be limited to that precise form beyond the limitations as may be imposed by the following claims.

I claim:

1. An overhead irrigating system comprising a water supply standard sealed at its top end, a water distributing pipe interconnecting with and extending laterally from said standard at an outlet spaced a distance below the top of the standard, a swivel connection in said lateral pipe to permit oscillation of that pipe, and means for oscillating said pipe, that part of the standard above said outlet serving as an air chamber, said lateral pipe having a fixed length between said standard and said swivel connection, said oscillating means comprising an electric motor carried by said fixed pipe length, and driving means between the motor and said lateral pipe connecting therewith beyond said connection, and an electrical supply line carried by said standard above said outlet.

2. In an overhead irrigating system, a water pipe line consisting of a fixed length, an oscillatable length, and a swivel union connection between the two lengths; an electric motor carried by the fixed pipe length, a spider driven by the motor, a connecting link adjustably carried by means attached to said spider, means for shifting said link both circumferentially and radially of said spider, and means interengaging the oscillatable pipe length and said connecting link, one end of said link being moved in a circle by said means attached to said spider, the other end of said link describing an arc of travel to rock said interengaging means and thereby oscillate said oscillatable pipe length.

3. In an overhead irrigating system, a water pipe line consisting of a fixed length, an oscillatable length, and a swivel union connection between the two lengths; an electric motor carried by the fixed pipe length, a spider driven by the motor, a connecting link adjustably carried by means attached to said spider, means for shifting said link both circumferentially and radially of said spider, and means interengaging the oscillatable pipe length and said connecting link, one end of said link being moved in a circle by said means attached to said spider, the other end of said link describing an arc of travel to rock said interengaging means and thereby oscillate said oscillatable pipe length, said means attached to said spider comprising an arm between said connecting link and said spider and a connecting link bearing adjustably fixed longitudinally of the arm.

4. In an overhead irrigating system, a water pipe line consisting of a fixed length, an oscillatable length, and a swivel union connection between the two lengths; an electric motor carried by the fixed pipe length, a spider driven by the motor, a connecting link adjustably carried by means attached to said spider, means for shifting said link both circumferentially and radially of said spider, and means interengaging the oscillatable pipe length and said connecting link, one end of said link being moved in a circle by said means attached to said spider, the other end of said link describing an arc of travel to rock said interengaging means and thereby oscillate said oscillatable pipe length, said means attached to said spider comprising an arm between said connecting link and said spider, said arm itself being circumferentially adjustable about said spider, and a connecting link bearing adjustably fixed longitudinally of the arm, said means for shifting said link comprising two spaced apart annular slots around said spider, and bolt means extending from said arm through said slots, whereby the circumferential adjustment of said arm may be had through 360 degrees around the spider.

5. In an overhead irrigating system, a water pipe line consisting of a fixed length, an oscillatable length, and a swivel union connection between the two lengths; an electric motor carried by the fixed pipe length, a spider driven by the motor, a connecting link adjustably carried by means attached to said spider, means for shifting said link both circumferentially and radially of said spider, and means interengaging the oscillatable pipe length and said connecting link, one end of said link being moved in a circle by said means attached to said spider, the other end of said link describing an arc of travel to rock said interengaging means and thereby oscillate said oscillatable pipe length, said means interengaging the connecting link and the oscillatable pipe comprising a clamp adjustable for engagement circumferentially around the pipe and carrying a connecting link engaging bearing, whereby the arc of travel of the pipe may be shifted circumferentially of the pipe axis.

6. In an overhead irrigating system, a water pipe line consisting of a fixed length, an oscillatable length, and a swivel union connection between the two lengths; an electric motor carried by the fixed pipe length, a spider driven by the motor, a connecting link adjustably carried by means attached to said spider, means for shifting said link both circumferentially and radially of said spider, and means interengaging the oscillatable pipe length and said connecting link, one end of said link being moved in a circle by said means attached to said spider, the other end of said link describing an arc of travel to rock said interengaging means and thereby oscillate said oscillatable pipe length, a clamp detachably fitting over said fixed pipe length and supporting said motor to one side thereof, and means between the clamp and the fixed pipe for circumferentially fixing the clamp location.

RAYMOND P. PARADISE.